United States Patent [19]

Sels et al.

[11] Patent Number: 5,008,944
[45] Date of Patent: Apr. 16, 1991

[54] LOUDSPEAKER SYSTEM FOR MOTOR VEHICLES

[76] Inventors: Michael O. Sels, 8524 N. 23nd Dr., Phoenix, 85051; Bryan D. Combs, 1001 N. 32nd St., Apt. C-21, Phoenix, Ariz. 85008

[21] Appl. No.: 475,812

[22] Filed: Feb. 6, 1990

[51] Int. Cl.⁵ .............................................. H04B 1/00
[52] U.S. Cl. ..................................... 381/86; 181/141
[58] Field of Search ............... 181/141, 145; 381/87, 381/88, 90, 86, 188, 205

[56] References Cited

U.S. PATENT DOCUMENTS

| | | | |
|---|---|---|---|
| 4,136,755 | 1/1979 | Goes | 181/141 |
| 4,206,830 | 6/1980 | Sohma et al. | 181/141 |
| 4,567,959 | 2/1986 | Prophit | 181/156 |
| 4,582,162 | 4/1986 | Katsuno | 381/86 |
| 4,597,470 | 7/1986 | Takagi et al. | 381/86 |
| 4,602,358 | 7/1986 | Sato | 381/86 |

*Primary Examiner*—Forester W. Isen
*Attorney, Agent, or Firm*—Antonio R. Durando; Harry M. Weiss

[57] ABSTRACT

The use of regular size woofers for motor vehicle loudspeaker application is made possible by utilizing the rear windshield space in the vehicle. High fidelity low frequency sound and deep-box effect result without sacrifice of space in the passenger compartment. A rear view window and windshield can be incorporated in the sound box to retain rear viewing capabilities from the driver's seat.

10 Claims, 1 Drawing Sheet

LOUDSPEAKER SYSTEM FOR MOTOR VEHICLES

BACKGROUND OF THE INVENTION

1. Field of the Invention

This invention pertains to the general field of loudspeaker systems for use in motor vehicles. In particular, it provides a new system for improving the quality of sound reproduced in the vehicle, especially in the passenger cabin of trucks.

2. Description of the Prior Art

With the continuously improving quality of high fidelity sound in general, people strive to adapt the characteristics of home stereo systems to the driving environment of their motor vehicles. Unfortunately, limited space and poor noise insulation in such vehicles render this task rather difficult and sometimes cumbersome.

With respect to sound quality, a greatly limiting factor in a vehicle is the unavailability of sufficient space to accommodate the appropriate equipment. Obviously, the most important factor in the system is the technical quality of the speakers used, but even the best quality speakers are large and require much space for installation in the passenger compartment of motor vehicles. Sound systems often separate the emission of low frequency ("bass") from midrange and high frequency waves by channeling them to separate speakers, normally referred to as "woofers." They tend to be very large because the quality of their performance is related, among other things, to the size of the diaphragm and vibrating cone in the device. While this feature does not constitute an inherent problem for home and other uses, it does for motor vehicle applications, where the space available is generally very limited. This is particularly true in the case of trucks because passenger cabin space is often sacrificed in order to maximize the length of the truck bed and, therefore, the utility of the vehicle itself.

To circumvent these unavoidable problems, motor-vehicle and stereo systems manufacturers have developed amplifiers that enhance the low frequency sounds by manipulating the relative output power of each frequency range to suit the listener's expectation. They have also taken advantage of opportunities to improve sound quality by exploiting the enhancing effect of baffling materials and of vehicle geometry in the reproduction of low audio frequencies.

For example, by exploiting the ability of acoustic baffles to radiate sound with a lower cutoff frequency, U.S. Pat. No. 4,136,755 to Goes describes a speaker system that is incorporated into a hollow support structure filled with sound absorbing material, such as foam plastic. Because this support structure can perform other functions in addition to housing the speakers, such as providing a frame for dashboard instrumentation or constituting a part of a passive restraining system, the space occupied by this speaker system is not dedicated exclusively to sound reproduction. Therefore, the woofer can be larger than could otherwise be afforded in the average size automobile. Moreover, because of the acoustic characteristics of the absorbing material, bass performance is improved. This method of low frequency sound enhancement, though, relies on the baffling effect of the sound absorbing material, rather than on the true reproduction characteristics of the speaker itself.

Similarly, U.S. Pat. No. 4,567,959 to Prophit discloses a low frequency speaker designed to take advantage of truck cabin geometry to enhance the sound produced by a relatively small apparatus. Because of its size, the device can be installed behind each seat in the cabin without excessive sacrifice of useful space. On the other hand, it requires positioning the speaker within a few inches of a three surface corner to optimize its functioning, thus limiting space utilization in the vehicle.

It is the purpose of this invention to address the problem presented by space limitations in designing a speaker system with high fidelity in the low frequency range for motor vehicle passenger compartments. The invention is directed especially to trucks, where the interior noise in the cabin is normally relatively high and the available space is particularly small. A solution is found in utilizing the space behind the rear windshield of the vehicle to install speaker systems containing full size woofers of standard specifications.

BRIEF SUMMARY OF THE INVENTION

One objective of this invention is the development of a loudspeaker system for motor vehicle passenger compartments capable of reproducing low frequency sound with realistic tonal characteristics at volumes compatible with normal driving conditions. This invention achieves this result by employing regular size woofers, capable of normal range bass emission, in lieu of the compact speakers normally used for automotive applications.

Another objective of the invention is the minimization of the passenger compartment space dedicated to the loudspeakers system. This is accomplished by placing the speakers in the rear windshield space and by occupying otherwise unutilized space outside the vehicle.

A further objective of this invention is the realization of the above mentioned goals in an economical and commercially viable manner. This is done by utilizing components that are already developed and available in the open market at a variety of prices to suit the different quality needs of customers at large.

Various other purposes and advantages of this invention will become clear from its description in the specifications that follow, and from the novel features particularly pointed out in the appended claims.

Therefore, to the accomplishment of the objectives described above, this invention consists of the features hereinafter illustrated in the drawings and examples, fully described in the detailed description of the preferred embodiment and particularly pointed out in the claims. However, such drawings and description disclose but one of the various ways in which the invention may be practiced.

DETAILED DESCRIPTION OF THE INVENTION

The heart of this invention lies in the placement of a loudspeaker system in a rigid box that is installed in the rear window of the motor vehicle. The actual speakers that make up the system can be much larger than normally found in automotive apparata because the entire rear windshield surface is available to accommodate the speaker cones, including the large woofer cones. In addition, no interior room of the passenger compartment is used for the bodies of the speakers themselves because the box containing them extends entirely toward the outside of the window to which it is affixed. Thus, regular size, high fidelity speakers that are usually considered too large for automotive applications can be used without sacrificing useful space in the vehicle. Moreover, a deepbox sound effect can be obtained by selecting an appropriate thickness for the box enclosing the speakers.

Given the relatively wide surface of rear windows, the system of speakers can be arranged in the box with different spacings and geometric configurations to optimize sound quality according to the specific shape of the vehicle. Multiple sets of speakers can be used to reproduce stereo sound, each set comprising separate speakers for specific frequency ranges, as desired. If stereo sound reproduction is chosen, a dividing wall between the two sets of speakers in the middle of the box can be installed to improve sound separation. In addition, the speaker box may include a window appropriately positioned to permit viewing of the back of the vehicle through the rear view mirror.

As conceived, this invention is intended primarily for use in truck passenger cabins, where the space limitations are particularly acute and restrict the use of large loudspeaker equipment. Moreover, the normal noise level in truck cabins requires especially powerful audio equipment, which in turn tends to be larger to remain affordable.

Figure 3:
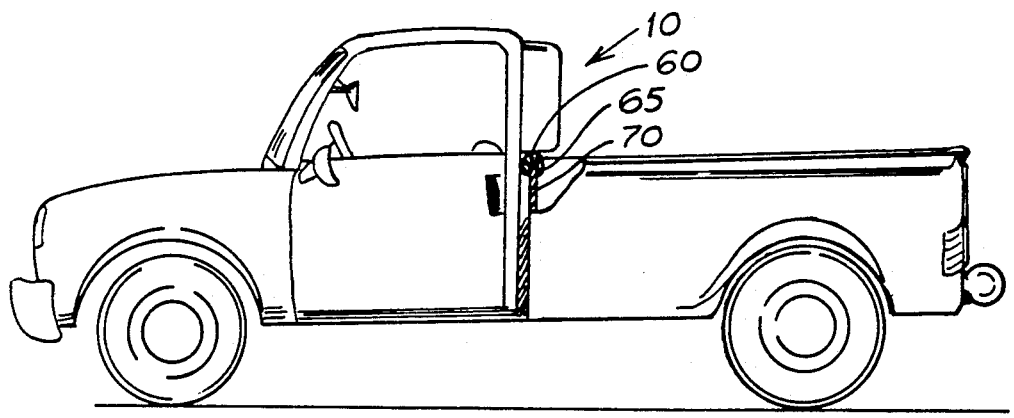
FIG. 3 illustrates a side view of the same system as it appears when installed in the rear windshield space of a pickup truck cabin.
Figure 1:
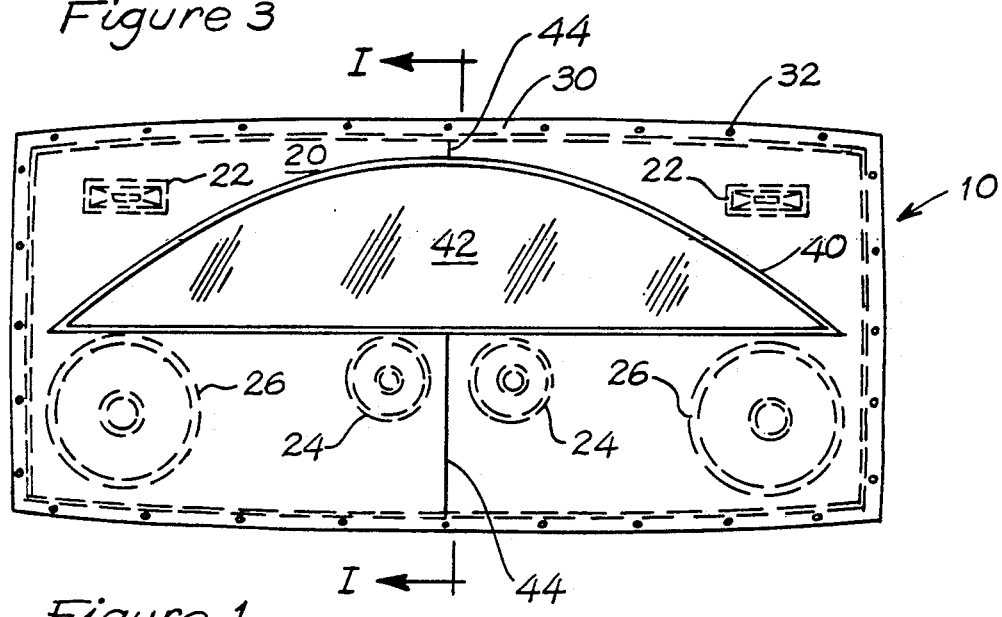
FIG. 1 illustrates a frontal view of the loudspeaker system box according to this invention which is designed for installation in the rear windshield space of a motor vehicle.
Figure 2:
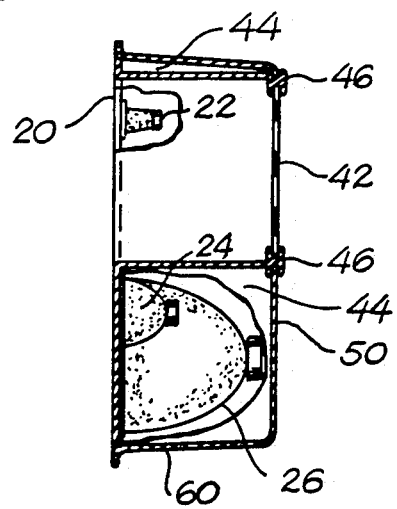
FIG. 2 illustrates a cut-off view of the same system taken on line I of FIG. 1, showing one set of speakers included in one side of the box and a window opening with a windshield mounted on the exterior side of the box.

Referring to FIGS. 1, 2 and 3, a particular embodiment of this invention is shown. While only one of many ways to effect the same result, the apparatus in these figures is believed to be the best example for practicing this invention in a safe, economical, and operationally efficient way.

This loudspeaker system consists of a rigid box 10, one side 20 of which is designed to match the shape of the rear windshield of the vehicle on which it is to be installed, a pickup truck in this example. Along the perimeter of such side 20, a ridge 30 is added for installation of the box in the rear window opening of the truck cab, where the rear windshield is normally found. Through this ridge, or equivalent means, the box can be affixed to the window opening with rubber molding, or with any mechanical fastener such as screws, rivets, clamps and bolt assemblies. If molding is not used, protective padding between the ridge 30 and the window frame is recommended to avoid direct contact of the two rigid surfaces and minimize vibrations of the speaker box. In the example illustrated in FIG. 1, the ridge 30 is fastened by either rivets or screws locking it to the vehicle's window frame through holes 32.

Attached to the surface of side 20 from the inside of the box 10 lie two sets of speakers for stereophonic function. Each set consists of a high frequency speaker 22 (horn tweeter), a four inch midrange frequency speaker 24, and a 12 inch low frequency speaker 26 (woofer). A window opening 40 is incorporated in the box to retain the rear view function of the truck's rear view window. Accordingly, a transparent windshield 42 is mounted in such opening 40, either as a single panel on side 20 or on side 50 of box 10, or as a double panel on both sides. In FIG. 2, only one windshield 42 is illustrated, installed on the back side 50 of the box 10. Standard molding material 46 is shown to secure the windshield 42 to the opening in side 50. Finally, a partition 44 joins sides 20 and 50 to separate the two sets of speakers for better stereo effect.

As illustrated in FIG. 3, the bottom side 60 of box 10, measuring approximately 12 to 18 inches for good deepbox sound, may be anchored to the upper rim of the front side of the truck's bed 70 with a rubber boot 65, or other comparable material, to absorb vibrations during vehicle operation. This protection is necessary because truck beds and cabins are mounted independently on the vehicle's frame and must be free to vibrate separately. Therefore, if the box 10 is anchored to both the vehicle's cabin and bed, both points of attachment cannot be rigid in order to avoid damage caused by the two structures, separate movements. Naturally, appropriate ducts and leads must be provided to connect the speakers inside box 10 to the amplifier portion of the audio system.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparata and methods.

I claim:

1. A motor vehicle loudspeaker system, comprising:
   (a) a sound box of shape and size suitable for mechanical installation in the rear windshield space of, and mounted in, the rear window of said motor vehicle;
   (b) loudspeakers contained in said sound box and facing an interior of said motor vehicle; and
   (c) means for electrically connecting said loudspeakers to an audio amplifier in said motor vehicle.

2. The loudspeaker system defined in claim 1, wherein said loudspeakers comprise two sets of speakers, each of said sets containing a high frequency speaker, a midrange frequency speaker, and a low frequency speaker.

3. The loudspeaker system defined in claim 2, wherein said sound box further comprises a partition between said two sets of speakers to enhance stereo sound effect by separating the sound emission from each of said sets of speakers.

4. The loudspeaker system defined in claim 1, wherein said sound box further comprises a window for rear view from said motor vehicle.

5. The loudspeaker system defined in claim 3, wherein said sound box further comprises a window for rear view from said motor vehicle.

6. A method of enhancing sound fidelity of a motor vehicle loudspeaker system, comprising the steps of:
   (a) providing a sound box of shape and size suitable for mechanical installation in the rear windshield space of, and mounting said box in, the rear window of said motor vehicle;
(b) enclosing loudspeakers in said sound box, said loudspeakers facing an interior of said motor vehicle; and
(c) providing means for electrically connecting said loudspeakers to an audio amplifier in said motor vehicle.

7. The method defined in claim 6, wherein said loudspeakers comprise two sets of speakers, each of said sets containing a high frequency speaker, a midrange frequency speaker, and a low frequency speaker.

8. The method defined in claim 7, further comprising the step of:
(d) providing a partition between said two sets of speakers to enhance stereo sound effect by separating the sound emission from each of said sets of speakers.

9. The method defined in claim 6, further comprising the step of:
(e) providing a window for rear view from said motor vehicle.

10. The method defined in claim 8, further comprising the step of:
(e) providing a window for rear view from said motor vehicle.

* * * * *